US009548046B1

(12) United States Patent
Boggiano et al.

(10) Patent No.: US 9,548,046 B1
(45) Date of Patent: Jan. 17, 2017

(54) CONTINUOUS ANALYSIS WORD COUNTER

(71) Applicant: VersaMe, Inc., Portola Valley, CA (US)

(72) Inventors: Jon Boggiano, Huntersville, NC (US); Jill Desmond, Cornelius, NC (US); Matthew Chung, San Jose, CA (US); Chris Boggiano, Huntersville, NC (US)

(73) Assignee: VersaMe, Inc., Portola Valley, CA (US)

( * ) Notice: Subject to any disclaimer, the term of this patent is extended or adjusted under 35 U.S.C. 154(b) by 0 days.

(21) Appl. No.: 14/872,927

(22) Filed: Oct. 1, 2015

(51) Int. Cl.
*G10L 15/02* (2006.01)
*G10L 15/05* (2013.01)
*G10L 15/22* (2006.01)

(52) U.S. Cl.
CPC .............. *G10L 15/02* (2013.01); *G10L 15/05* (2013.01); *G10L 15/22* (2013.01)

(58) Field of Classification Search
CPC ............ G06F 17/289; G06F 17/2827; G06F 17/30861; G06F 17/218; G06F 17/2288; G06F 17/2836; G06F 17/2872; G06F 17/30882; G06F 17/30887; G06F 17/30893; G06F 17/30873; G06F 2216/07; G06F 3/0482; G10L 15/265
See application file for complete search history.

(56) References Cited

U.S. PATENT DOCUMENTS

| | | | | |
|---|---|---|---|---|
| 5,680,511 A * | 10/1997 | Baker | ................. | G10L 15/1815 704/257 |
| 6,009,392 A * | 12/1999 | Kanevsky | ............ | G10L 15/063 704/240 |
| 6,185,527 B1 * | 2/2001 | Petkovic | ........... | G06F 17/30746 704/231 |
| 2002/0023020 A1 * | 2/2002 | Kenyon | ................ | G06Q 30/02 704/231 |
| 2009/0043581 A1 * | 2/2009 | Abbott | .................. | G10L 15/187 704/254 |
| 2014/0067391 A1 * | 3/2014 | Ganapathiraju | ........ | G10L 15/01 704/236 |
| 2015/0331941 A1 * | 11/2015 | Defouw | .................. | G10L 25/51 707/687 |

OTHER PUBLICATIONS

Xu, Dongxin, Umit Yapanel, and Sharmi Gray. Reliability of the LENATM Language Environment Analysis System in young children's natural home environment. LENA Foundation Technical Report LTR-05-02). Retrieved from http://www. lenafoundation. org/TechReport. asp x/Reliability/LTR-05-2, 2009.*
Ziaei, Ali, Abhijeet Sangwan, and John HL Hansen. "A speech system for estimating daily word counts." Interspeech. 2014.*

* cited by examiner

*Primary Examiner* — Matthew Baker
(74) *Attorney, Agent, or Firm* — Atlas Intellectual PropertyLaw; Travis Banta

(57) ABSTRACT

This disclosure generally relates to a method and system for counting words spoken by a user. For example, an audio input representative of spoken speech may be received and divided into a series of windows. The windows may be analyzed to determine whether or not one or more of the windows meet one or more speech criteria. The number of times a window meets one or more speech criteria may be counted and modified by a modifier factor to determine a word count. The word count may be output in a graphical user interface.

20 Claims, 6 Drawing Sheets

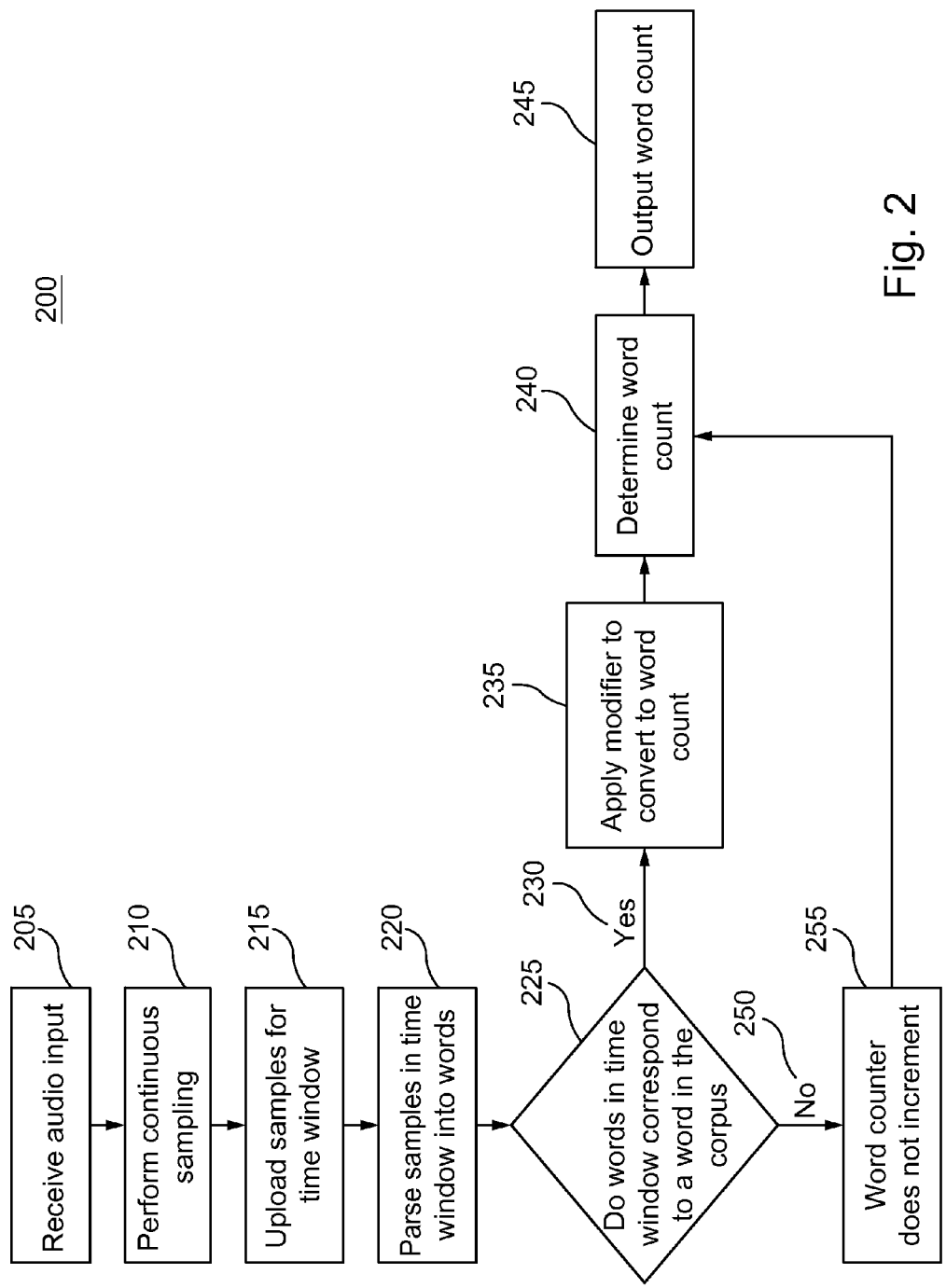

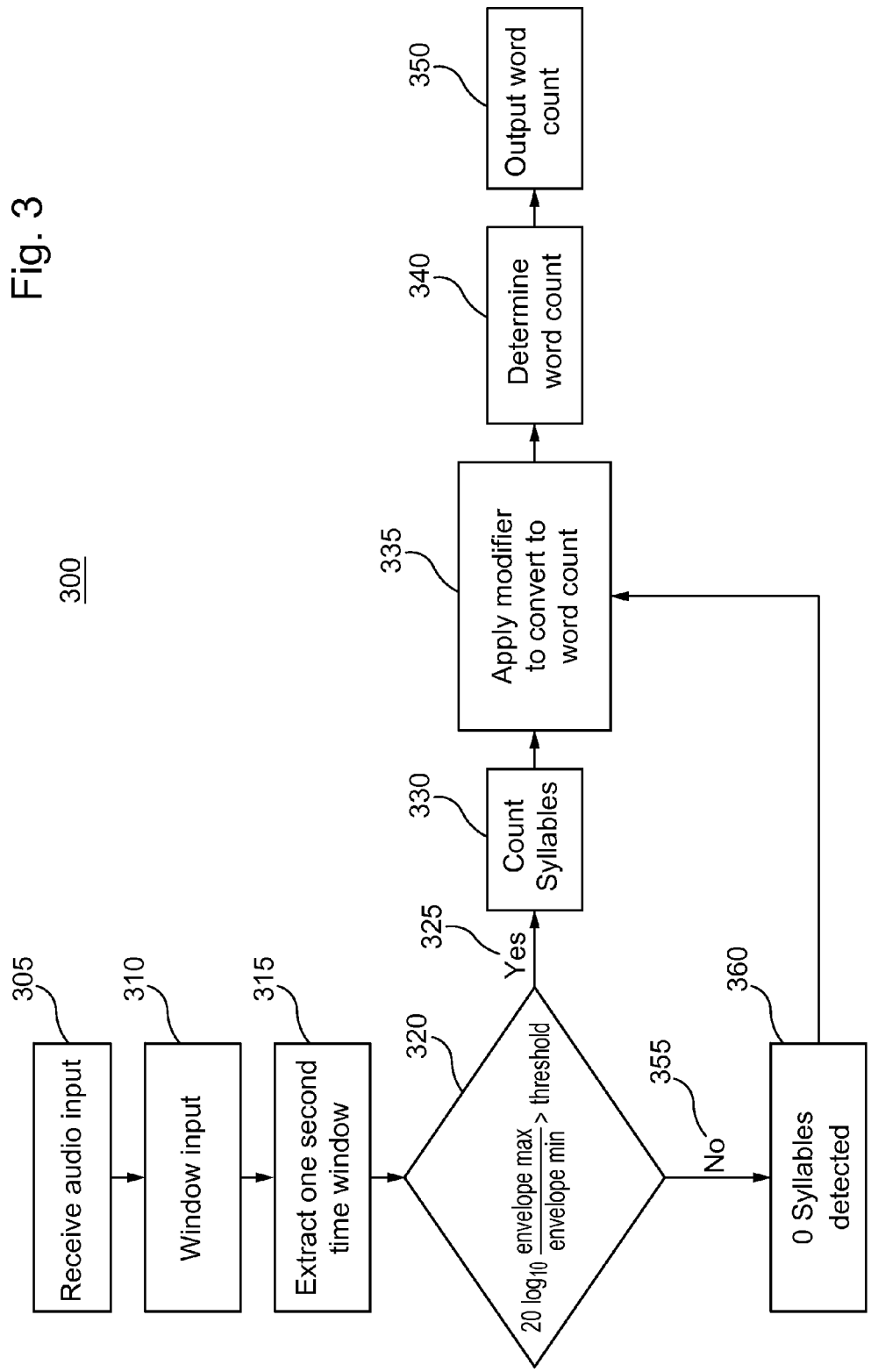

CONTINUOUS ANALYSIS WORD COUNTER

BACKGROUND

1. Technical Field

This disclosure relates generally to a continuous analysis word counter. More specifically, the device disclosed herein relates to a device that may receive audio input representative of one or more spoken words, analyze the audio input continuously, and determine a number of words spoken by a user over a period of time.

2. Description of the Related Art

Word count is at least one metric used to quantify levels of human interaction. In one example, word processing programs use word count to assess an approximate length of a document. Some courts in the United States, for example, limit the number of words that may be submitted in a pleading. Written word counts are relatively simple to ascertain. For example, a word processing program may identify a word by determining whether or not an alphanumeric character appears between two grammatical spaces. Alternatively, because written words are fixed on paper or an electronic display, a word count may be ascertained by simple counting.

Spoken word counts, however, are more difficult to ascertain than written word counts. Nonetheless, a word count for spoken words is a useful metric for ascertaining human interaction in a number of circumstances. For example, public speakers may use a word count to assess effectiveness in addressing a crowd. In another example, recent research has shown a correlation between brain development in young children and the degree of interaction they have with parents and others. Specifically, a high degree of correlation exists between the quantity of words spoken to children younger than four years old and brain development in children younger than four years old. Simply put, the number of words spoken to a child between birth and age four largely sets the child's mental ability trajectory for the child's lifetime. Given the importance many caregivers place on a child's success in life, and the correlation between the quantity of words spoken to a child and brain development, it is desirable to track the number of words spoken to a child, for example, over a substantial period of time, even years. Conventional technology, however, has failed to provide adequate ability to accurately count and track a number of spoken words.

For example, conventionally, spoken word counts have been ascertained by recording and subsequently transcribing speech for manual counting. While this technology is fairly accurate in determining a spoken word count, this method of manually obtaining a count is profoundly inefficient in terms of effort and time effectiveness. Alternatively, an observer may manually count words as the words are spoken. However, manually counting words as they are spoken is prone to error and can be quite expensive in terms of paying the observer to manually count words. Accordingly, accurately tracking a number of words spoken over time has heretofore been profoundly difficult, expensive, and time consuming, if possible at all.

Accordingly, it is one object of this disclosure to provide an apparatus to count the number of words spoken by a user. Another object of this disclosure is to provide an apparatus that continuously counts the number of words spoken by a user in real time. A further object of this disclosure is to provide alternative low-power options for counting words in a mobile device with a reasonable degree of accuracy.

SUMMARY

Disclosed herein is a method of providing a word count to a user that may be performed by a word counting device. The word counting device receives an audio input representative of spoken speech and windows the audio input representative of spoken speech. At this point, the word counting device may determine whether or not one or more windows of windowed audio input representative of spoken speech meet one or more speech criteria. The word counting device counts a number of instances during which the one or more windows of windowed audio input representative of spoken speech meet one or more speech criteria. Once counted, the word counting device applies a modifier factor to the number of instances during which the one or more windows of windowed audio input representative of spoken speech meet one or more of the speech criteria and determines, in response to applying the modifier factor, a word count. Finally, the word counting device outputs the word count in a graphical user interface associated with the word counting device.

Further disclosed herein is a system for providing a word count to a user. The system includes a microphone configured to receive an audio input representative of spoken speech; a windowing module configured to window the audio input representative of spoken speech; a determination module configured to determine whether or not one or more windows of windowed audio input representative of spoken speech meet one or more speech criteria; a counting module configured to count a number of instances during which the one or more windows of windowed audio input representative of spoken speech meet one or more speech criteria; a modifier module configured to apply a modifier factor to the number of instances during which the one or more windows of windowed audio input representative of spoken speech meet one or more of the speech criteria; a word counter module configured to determine, in response to the modifier module applying a modifier factor, a word count; and an output module configured to output the word count in a graphical user interface associated with the word counting device.

BRIEF DESCRIPTION OF THE DRAWINGS

The accompanying drawings illustrate embodiments of a word counting device, methods associated with using the word counting device, and graphical user interfaces implementing user interface features of the word counting device.

FIG. 1b illustrates consecutive windows of the exemplary digitally sampled audio input shown in FIG. 1a.

FIG. 2 illustrates an exemplary method of ascertaining a word count from spoken speech using a corpus.

FIG. 3 illustrates an exemplary method of ascertaining a word count from spoken speech without using a corpus.

DETAILED DESCRIPTION OF PREFERRED EMBODIMENTS

Figure 1A:
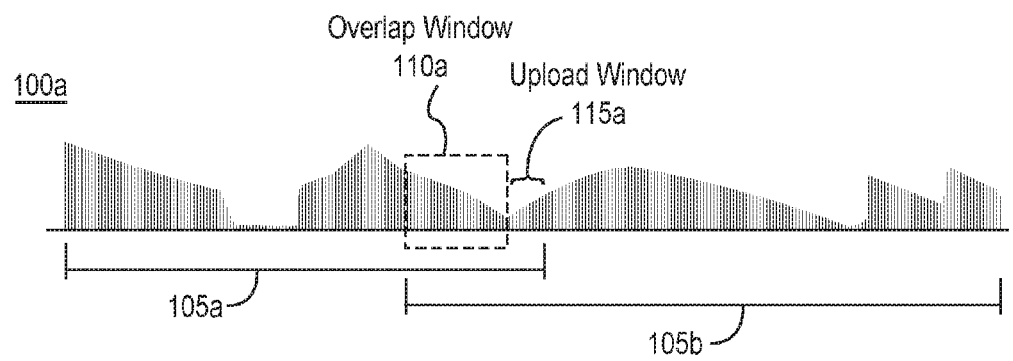
FIG. 1a illustrates an exemplary digitally sampled audio input.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Real time analysis of audio input has conventionally been avoided principally because the technology required to perform such real time analysis has been inconvenient to use due to a number of factors including size of the equipment, the interfering effect the equipment has on a speaker, and the complexity involved in accurately analyzing the audio input. Accordingly, two significant obstacles have limited the ability for speakers, for example, to obtain an accurate word count of a speech or other presentation. First, because the audio analysis equipment has not been portable in any meaningful sense, speakers have lacked a non-intrusive device to analyze speech. Second, devices small enough to have little or no effect on a speaker have either lacked the processing power required to analyze speech input or battery power to sustain the ability to analyze speech input in substantially real time over the duration of a presentation.

In an effort to overcome these obstacles, a non-intrusive word counting device is disclosed herein that contains adequate processing power and battery power to analyze audio input, such as speech, in substantially real time for a relatively extended period of time. For example, the word counting device disclosed herein may be implemented as a mobile device such as a smart phone, a tablet, a laptop computer, a music storage and playback device, or a personal digital assistant. Any other portable device capable of implementing a software application may be used to analyze speech input using the techniques described herein. These exemplary devices may be used inconspicuously by a speaker during a speech, for example, without intruding on the speaker's thought process, without adding significant weight, distraction, or bulk to the speaker, without affecting the speaker's appearance, or without otherwise annoying the speaker.

These exemplary devices may include a combination of one or more application programs and one or more hardware components. For example, application programs may include software modules, sequences of instructions, routines, data structures, display interfaces, and other types of structures that execute operation. Further, hardware components implementing modules and other means disclosed herein may include a combination of processors, microcontrollers, busses, volatile and non-volatile memory devices, non-transitory computer readable memory device and media, data processors, control devices, transmitters, receivers, antennas, transceivers, input devices, output devices, network interface devices, and other types of components that are apparent to those skilled in the art.

Figure 1B:
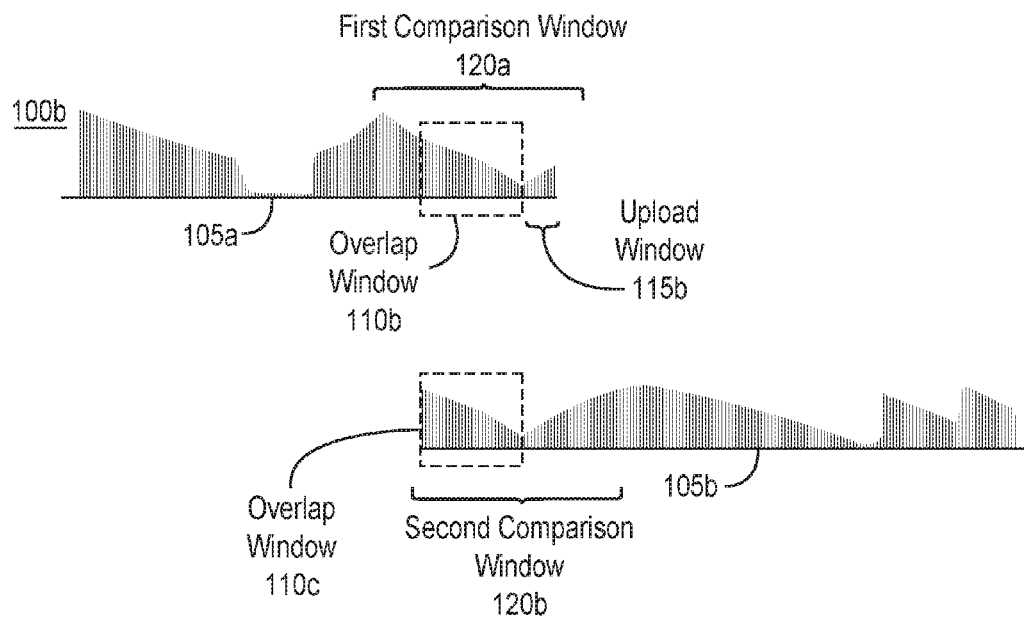

Conventionally, real time analysis of live input (audio, video, or any other data being received in real time) has been very difficult because of the way information, in many cases, is stored. For example, during recording of audio input, a computer may store the audio input in memory files within some type of computer memory. However, in many instances computers cannot store information into memory and, at the same time, perform operations on that information. More simply put, computers cannot analyze data until that data is stored in a memory device. This intricacy of computer design makes performing substantially real time analysis of any received input very difficult, if not impossible with conventional computer architecture. FIGS. 1a and 1b show a mechanism that overcomes conventional inability to perform substantially real time analysis of received input.

FIG. 1a illustrates an exemplary digitally sampled audio input 100a. In one embodiment, digitally sampled audio input 100a comprises a continuous audio input. In some embodiments, audio input may comprise spoken speech although methods for analyzing continuous audio input disclosed herein apply to any continuous input; audio, video, or any other stream of continuous data. For exemplary purposes, digitally sampled audio input 100a may represent approximately sixty seconds of continuous audio input. Digitally sampled audio input 100a may be divided into a first window 105a of digitally sampled audio input 100a and a second window 105b of digitally sampled audio input 100a. For this hypothetical example, first window 105a may comprise approximately thirty-five seconds of digitally sampled audio input 100a and second window 105b may comprise approximately thirty-five seconds of digitally sampled audio input 100a. Accordingly, since in this hypothetical example digitally sampled audio input 100a represents approximately sixty seconds of continuous audio input, first window 105a and second window 105b overlap by approximately four seconds, shown as overlap window 110a. Further, because data storage is not instantaneous, an additional second may be provided as upload window 115a to allow a device to upload or store audio input as it is being received.

In this example, continuous audio input (whether sampled or not) may be divided into windows, such as first window 105a and second window 105b to allow a word counting device to both store data and analyze data in substantially real time. It is advantageous that first window 105a and second window 105b are relatively short because a smaller window of data requires less memory space than a larger window of data, a smaller window of data is typically uploaded faster than a larger window of data, and a smaller window of data is typically analyzed faster than a larger window of data. Of course, the exact time lengths of any window utilizing the principles disclosed herein can vary depending upon the needs of a particular implementation. For example, while first window 105a and second window 105b are disclosed herein to last for 35 seconds, windows for other applications may be substantially shorter or longer. In short, time lengths of any window may be as short or as long as needed and a relatively small window may be significantly larger than first window 105a and second window 105b depending on the application (e.g., relatively small windows for data received from an orbital satellite may be significantly larger than first window 105a and second window 105b which receives audio input from a local source). The time lengths of overlap window 110a and upload window 115a may be similarly adjusted based on a particular implementation.

Accordingly, as shown in FIG. 1a, continuous input (audio, video, or any other continuous or streaming input data) may be "windowed" (i.e., divided into smaller sections partitioned by time) to allow nearly instantaneous analysis of the received audio input as soon as a window is stored in a memory device associated with a word counting device. Because a word counting device may both receive new data and analyze received data substantially simultaneously, a word counting device can analyze a window of received data in substantially real time. In a word counting context, such an implementation is advantageous because each spoken word in a window can be received by a word counting device and counted nearly instantaneously.

FIG. 1B illustrates first window 105a and second window 105b which are consecutive windows 100b of the exemplary digitally sampled audio input 100a shown in FIG. 1a. As discussed above, first window 105a and second window 105b overlap each include an overlap window, first overlap window 110b and second overlap window 110c respectively. To ensure that each word in consecutive windows 100b is accounted for, a word counting device may begin recording second window 105b before the word counting device finishes recording first window 105a. Accordingly, first overlap window 110b is created in first window 105a and second overlap window 110c is created in second window 105b. The word counting device may compare first overlap window 110b and second overlap window 110c to determine where the word counting device should stop analyzing first window 105a and start analyzing second window 105b. By comparing the individual samples within a number of samples of first overlap window 110b and second overlap window 110c, identified as first comparison window 120a and second comparison window 120b, the word counting device is able to exactly identify where to begin and conclude analysis of first window 105a and second window 105b. First comparison window 120a and second comparison window 120b may be compared to find a point where first overlap window 110b and second overlap window 110c contain samples that are substantially or exactly the same. As before, any duration for first comparison window 120a and second comparison window 120b may be used as necessitated by a particular implementation. In one embodiment, first comparison window 120a and second comparison window 120b may include five seconds of audio input samples for comparison. In this way a point within first overlap window 110b and second overlap window 110c can be identified as the ending point for analysis of the first window 105a and a starting point for analysis of second window 105b. Ideally, the ending point for analysis of the first window 105a and the starting point for the second window 105b is two consecutive samples in first overlap window 110b and second overlap window 110c.

In some embodiments, the first window 105a may include upload window 115b while, due to uploading the remaining portion of first window 105a, the particular samples contained within upload window 115b are lost. However, because second window 105b begins recording during second overlap window 110c, any samples that are received while first window 105a is uploaded are simply accounted for when second window 105b is analyzed.

Accordingly, a word counting device may comprise a windowing module configured to create a series of windows representative of a continuous audio input, a device storage configured to store the windows, a comparison module configured to compare one window to another, and a determination module configured to determine where one window in the series of windows ends and where another window in the series of windows begins. Each of these modules may be implemented as a single stand-alone module or may include multiple elements or modules and means to perform the windowing described in FIG. 1a and FIG. 1b.

FIG. 2 illustrates an exemplary method 200 of ascertaining a word count from spoken speech using a corpus although method 200 could be applied to any audio input. Method 200 begins by receiving audio input at a word counting device at step 205. The word counting device may include, for example, a microphone configured to receive the audio input. After the audio input is received, the word counting device performs continuous sampling of the audio input at step 210. In this example, the word counting device converts an analog speech signal into a digital signal using known digital to analog conversions. The digital representation of the analog audio input comprises a number of digital samples of the analog audio input. Once the audio input has been digitized in step 210, method 200 moves to step 215 where the digital representation of the analog audio input is uploaded or stored within the word counter device for analysis using the techniques described above with respect to FIG. 1a and FIG. 1b.

At this point, method 200 includes parsing or dividing the digital representation of the analog audio input into words at step 220. Since determining exactly what word was spoken at step 220 would increase the required level of overall processing, and the required battery power commensurate with that level of overall processing, the word counting device instead determines only whether or not the detected word corresponds to one or more words included in a corpus. A corpus can be thought of as a substantially abbreviated dictionary that includes, for example, between 5 and 500 words. The number of words chosen to be included in the corpus may be balanced between two conflicting principles. First, when more words are included in the corpus, the overall word count produced is more accurate. Second, however, is that when more words are included in the corpus, more processing power, and battery power, is required to ascertain whether or not a particular spoken word is one of the words within the corpus. Accordingly, the exact number of words in the corpus may be selected based on the particular goals for the word counting device.

It is further advisable, in many circumstances, to include words in the corpus that are relatively short or relatively common. For example, prepositions in the English language may be suitable words to include in a corpus. Prepositions are fairly common in the English language and are generally quite short relative to other words in the English language. Other words that may be suitable to include in a corpus include pronouns (and their possessives), conjunctions, interjections, articles, determiners, numerals, and even some nouns, verbs, adverbs and adjectives.

At step 225, the word counting device attempts to identify any correspondence between one or more words in a particular time window and one or more words in the corpus. In other words, the word counting device detects whether or not any spoken word is similar to any word in the corpus. The word counting device may indicate at step 230—Yes that a detected spoken word is included in the corpus. However, in some embodiments, different spoken words may sound similar and may be detected as corresponding to a word in the corpus even when a particular word is not included in the corpus. For example, if the corpus includes the word "your" the word counting device may detect that the spoken word "you're" or "yore" corresponds to "your" and indicate at step 230—Yes, that the detected spoken word does correspond to a word in the corpus.

In this embodiment, the word counting device is merely determining whether or not a word is included within a corpus and not actually counting each and every word, in order to minimize required processing and battery power. Since an exemplary corpus may include approximately 250 words, many spoken words will not be included in the corpus. Furthermore, words that are included in the corpus may have homophones that incorrectly register as being included in the corpus. Other words that are included in the corpus may sound similar to words that are not in the corpus but yet still register, in some embodiments, as being included in the corpus (i.e., the word "yell," which is not included in the corpus may incorrectly register as the word "tell," which is included in the corpus), which may adversely affect the accuracy of the determined word count. In order to generate an accurate word count, therefore, a modifier is applied to convert the number of words that correspond to words in the corpus to overall word count. Through extensive testing, it has been determined that each spoken word detected as being similar to a word in the corpus is equivalent to between 1 and 2 words in the overall word count. Accordingly, the number of spoken words detected to be within the corpus at step 230—Yes may be multiplied by a modifier factor of between 0.8 and 2.0 at step 235 to obtain a reasonably accurate overall word count at step 240.

One further advantage of applying a modifier to obtain a reasonably accurate overall word count at step 240 is that the modifier may be changed depending on a speaker's setting. For example, a political figure presenting a speech to the general public may skew towards simpler smaller words in preparing a speech. In such a case, the modifier applied to the political figure's speech may be a modifier factor of 1.5. A doctor presenting a speech at a meeting of cardiac surgeons may skew towards bigger more complicated words in preparing a speech. Accordingly, the modifier applied to the doctor's speech may be a modifier factor closer to 1.9. In another embodiment, a parent speaking to a young child and concerned about the number of words the child hears during the first four years of the child's life may apply a modifier factor of 1.0-1.3 since words spoken to a young child are typically very small and simple. In one embodiment, the word counting device may track the age of a child and adjust the modifier factor automatically as the child ages and hears more complicated speech. In other words, when a child is born the word counting device may use a modifier factor of 1.0 and gradually adjust the modifier factor up to 1.3 over the first four years of the child's life.

Returning to FIG. 2, if a word detected by the word counting device is not included within the corpus at step 250—No, the word counter does not increment, or count a word, at step 255. Even though a word was spoken and not counted, the word is accounted for by the applied modifier in step 235. Thus, even though a word was spoken and not counted, the overall word count will be fairly accurate because the number of words that are detected as being similar to words in the corpus is multiplied by a modifier factor to account for the words that are spoken and not detected. Method 200 proceeds to step 240 where a word count is determined and output at step 245. The word count output may be displayed on a graphical user interface of the word counting device. Further, since method 200 is performed in substantially real time on each window of time samples, as discussed above with respect to FIGS. 1a and 1b, the word count output, and display thereof, continuously increases as audio input is received.

Accordingly, in order to implement method 200, the word counting device may comprise a windowing module configured to create a series of windows representative of a continuous audio input, a sampling module configured to convert the audio input into a digital signal representative of the audio input, a determination module configured to determine whether or not a word included in the digital signal representative of the audio input is included in a corpus, a counting module configured to count the number of times a spoken word is included in the corpus, a modifier module configured to apply a modifier to the number of words determined by the determination module to be included in the corpus, a word count module configured to determine a word count for the audio input, and an output module configured to output the determined word count. Each of these modules may be implemented as a single stand-alone module or may include multiple elements or modules and means to perform method 200 shown in FIG. 2.

FIG. 3 illustrates an exemplary method 300 of ascertaining a word count in a word counting device from spoken speech without using a corpus. Method 300 may be applied to any audio input, although for exemplary purposes, method 300 will be explained with reference only to speech input. Method 300 begins by receiving an audio input at step 305. The word counting device may include, for example, a microphone configured to receive the audio input. At step 310, an audio input signal is windowed. While in some respects, the windowing of the audio input signal at step 310 is different from windowing techniques described above, there are fundamental similarities. Specifically, at step 310, the audio input signal is continuously partitioned into small segments of data that are approximately one second in duration (i.e., "windowed"). Once the audio input signal is windowed, the word counting device extracts one second time windows to which method 300 is sequentially applied at step 315, as will be further described below.

At step 320, the word counting device determines whether or not the ratio of the maximum energy level (maximum energy envelope) in a particular window to the minimum energy level (minimum energy envelope) in that particular window is above a minimum threshold (based on logarithmic mathematical principles). In some embodiments, a minimum threshold may determine whether the amplitude of the loudest sound in a particular area is louder than the quietest sound in a particular area by enough of a margin that the sound is audible. In some embodiments, the quietest sound, or lack of sound, in an area may constitute, for example, a noise floor. A noise floor is the level of ambient noise in a particular area at a particular time. For example, the noise floor at a rock concert may be quite high while the noise floor in a forest may be quite low. Regardless, however, the word counting device determines whether or not the decibel level of the maximum energy envelope with respect to the minimum energy envelop in a particular window is above a minimum threshold level. Conceptually, the word counting device is determining whether or not additional volume/energy is being added to a particular area and whether or not that additional volume/energy, if any, is loud enough with respect to the quietest sound in that particular area to constitute spoken speech. If the maximum to minimum energy ratio of sound in a particular area exceeds the minimum threshold at step 325—Yes, the word counting device determines that speech is likely occurring and the word counting device should begin counting syllables. Accordingly, a syllable counter within word counting device begins counting syllables at step 330. One or more syllables may be counted at step 330.

Syllables, however, are not words even though some words may include only a single syllable. In some cases, however, words may contain multiple syllables. Thus, merely counting syllables is not sufficient to produce an accurate word count. Accordingly, in order to derive word count from syllables, a modifier factor is applied to convert the number of syllables counted into a word count in step 335. Based on testing, it has been determined that a modifier factor between 0.8 and 2.0 provides the most accurate word count. In this case, the number of syllables spoken by a speaker is largely determined by who the speaker is speaking to. For example, an adult speaking to a child will generally use simpler speech than the same adult would use in speaking to another adult. Accordingly, the modifier factor for speaking to a child may be more preferably set at approximately 1.3 (i.e., most words spoken to a child by an adult are monosyllabic) while the modifier factor for a presenter at a scientific conference may be more preferably set at approximately 1.8 (i.e., most words spoken by highly educated adults in a professional setting are polysyllabic).

In one embodiment, the word counting device may track the age of a child and adjust the modifier factor automatically as the child ages and hears more complicated speech. In other words, when a child is born the word counting device may use a modifier factor of 1.0 and automatically adjust the modifier factor up to 1.3 over the first four years of the child's life.

Actual word count may be determined in step 340 by multiplying the modifier factor by the number of syllables counted in step 330 and outputting a word count at step 350. The word count output may be displayed on a graphical user interface of the word counting device in substantially real time. The word count output may continuously increase as audio input is received.

Returning to FIG. 3, if the maximum of the energy envelope within a window with respect to the minimum of the energy envelope in that window does not exceed a minimum threshold, (step 355—No), the word counting device does not detect or count a syllable at step 360. However, the modifier factor applied in step 335 accounts for any potential incorrect determination of whether or not a syllable was spoken. Thus, even if a syllable was spoken and not counted, the overall word count will still be fairly accurate.

Accordingly, in order to implement method 300, the word counting device may comprise a windowing module configured to create a series of windows representative of a continuous audio input, an analyzing module configured to determine whether or not the maximum energy envelope of a window relative to the minimum energy envelope of the window, expressed in decibels, is greater than a minimum threshold level, a counting module configured to count detected syllables, a modifier module configured to apply a modifier factor to the number of syllables counted, a word count module configured to determine a word count for the audio input, and an output module configured to output the determined word count. Each of these modules may be implemented as a single stand-alone module or may include multiple elements and means to perform method 300 shown in FIG. 3.

Accordingly, by using the techniques described with respect to FIGS. 1a-3, an audio input representative of spoken speech may be analyzed to determine a word count that may be provided to a user. For example, a word counting device may receive audio input representative of spoken speech. In response, the word counting device may window the audio input representative of spoken speech and determine whether or not one or more windows of the windowed audio input representative of spoken speech meet one or more speech criteria. Speech criteria, for example, may include identifying certain words in a corpus as described with respect to FIG. 2 or determining whether or not the maximum energy envelope in a particular window relative to the minimum energy envelope in that window, expressed in decibels, exceeds a minimum threshold. The word counting device may count the number of instances during which one or more windows of windowed audio input representative of spoken speech meet one or more of the speech criteria. In order to convert the number of instances during which spoken speech meets one or more of the speech criteria into word count, the word counting device may apply a modifier factor to the number of instances during which spoken speech meets one or more of the speech criteria. In response to applying the modifier factor, the word counting device may determine an actual word count and output the word count in a graphical user interface associated with the word counting device.

Figure 4:
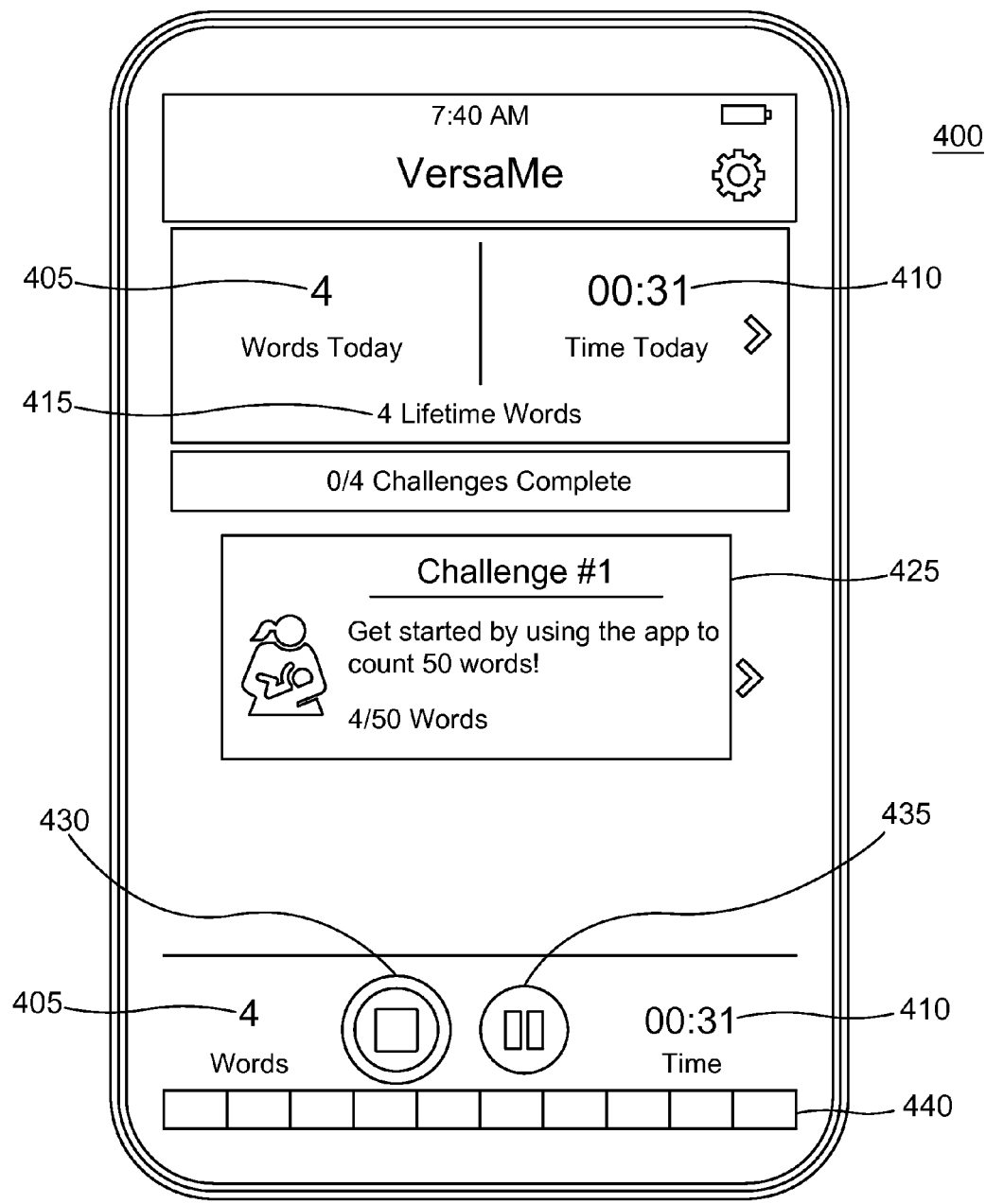
FIG. 4 illustrates an exemplary graphical user interface of a word counting device.

FIG. 4 illustrates an exemplary graphical user interface 400 implemented on a word counting device. Graphical user interface 400 includes word count elements 405 configured to display a word count derived by the techniques described herein. Graphical user interface 400 may serve as an output mechanism for, for example, methods 200 and 300 shown in FIG. 2 and FIG. 3 respectively. Elements 410, included within graphical user interface 400, track and display an amount of time during which a word count is being determined for a particular session. For example, if a parent is playing with a small child, the parent, using the word counting device, may track the number of words spoken to the child during play and the length of time spent interacting with the child. This information may help the parent determine an appropriate level and frequency of play with the child to achieve a desirable number of words spoken to a child during a time period, such as a day, week, month, year, or years. Graphical user interface 400 further includes a lifetime word count 415 that tracks the number of words spoken during all sessions to date.

Graphical user interface 400 may contain user interactive elements such as challenge user interface element 425. While any number of user interactive elements is possible, challenge user interface element 425 is shown as an exemplary user interactive element. The word counting device may provide various interactive elements to the user to solicit participation, provide encouragement, or other interaction with the word counting device. For example, challenge user interface element 425 solicits the user to interact with the word counting device and learn how to use the word counting device by using the word counting device to count 50 words.

Graphical user interface 400 further includes user control elements, such as user control element 430 and user control element 435. In one embodiment, one or more user control elements 430 or 435 may provide the user with control over the word counting device. As shown in FIG. 4, user control element 430 may be implemented as a start and stop button using any appropriate technology. For example, if the word counting device is implemented with a touch sensitive display, user control elements may be implemented as simulated buttons. Alternatively, if the word counting device is implemented with mechanical buttons, user control elements may be implemented as mechanical buttons. Any number of user control elements may be implemented to achieve any desirable implementation of the word counting device. User control element 435 may be implemented as a pause button configured to temporarily stop speech analysis.

Finally, graphical user interface 400 may further include an audio input level indicator 440. In this example, audio input level indicator 440 may display the input levels or volume of speech that will be analyzed by the word counting device. For example, louder speech would result in audio input level indicator 440 displaying a higher level of audio input while more quiet speech would result in audio input level indicator 440 displaying a lower level of audio input. Audio input level indicator 440 may indicate, to the user, an appropriate level of speaking volume to produce an accurate word count.

Figure 5:
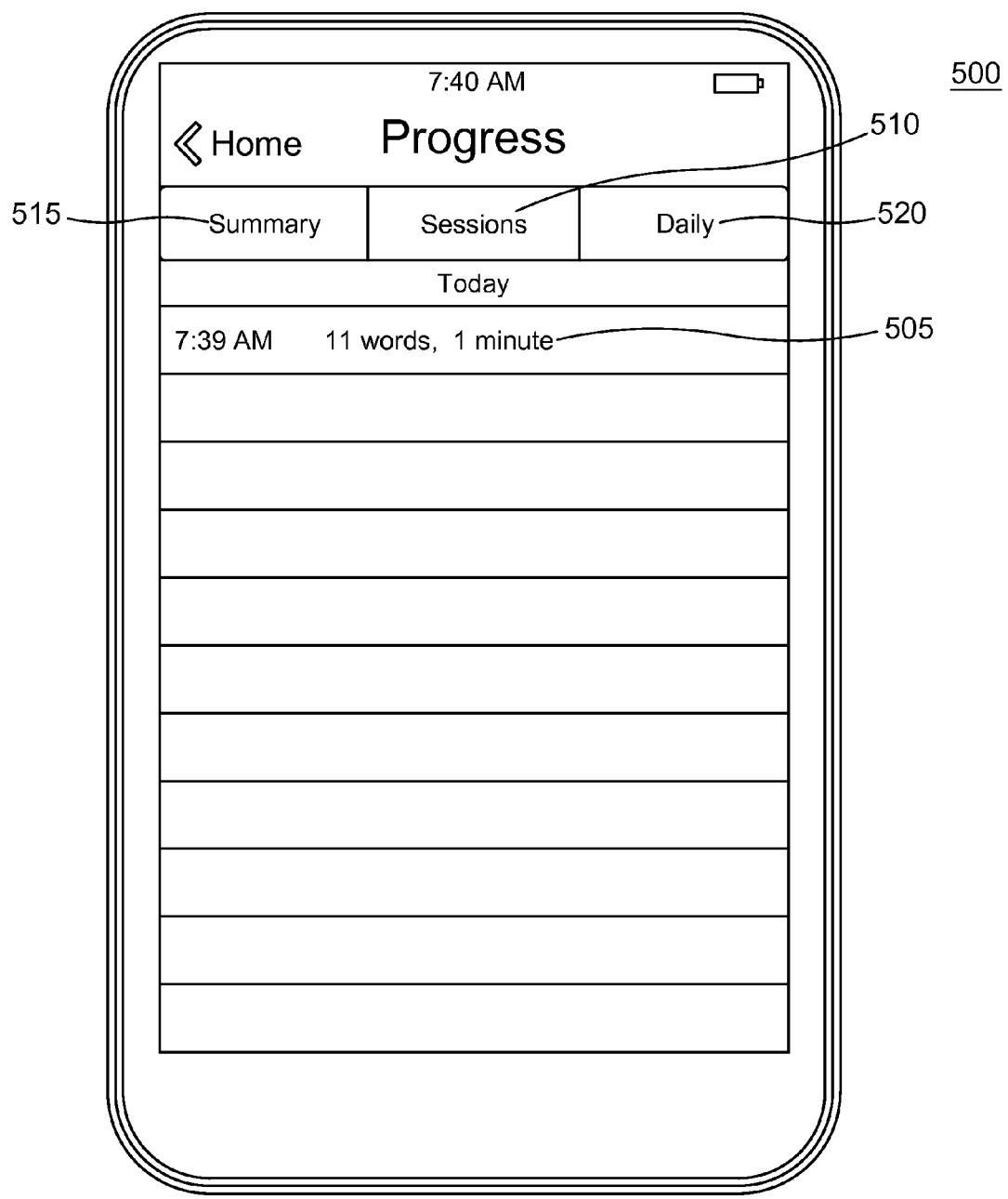
FIG. 5 illustrates an exemplary progress graphical user interface of a word counting device.

FIG. 5 illustrates an exemplary progress graphical user interface 500 of the word counting device. Graphical user interface 500 includes a progress indicator 505 for a session, a summary, or a daily progress. In this embodiment, a user has spoken 11 words in one minute beginning at 7:39 A.M. Graphical user interface 500 provides information about the number of words counted and the duration of a particular session by a user selecting Sessions tab 510. A user may further obtain information about a lifetime word count and the amount of time the word counting device counted words by selecting Summary tab 515. Finally, a user may obtain information about a daily word count and the amount of time the word counting device counted words during a particular day by selecting Daily tab 520.

Figure 6:
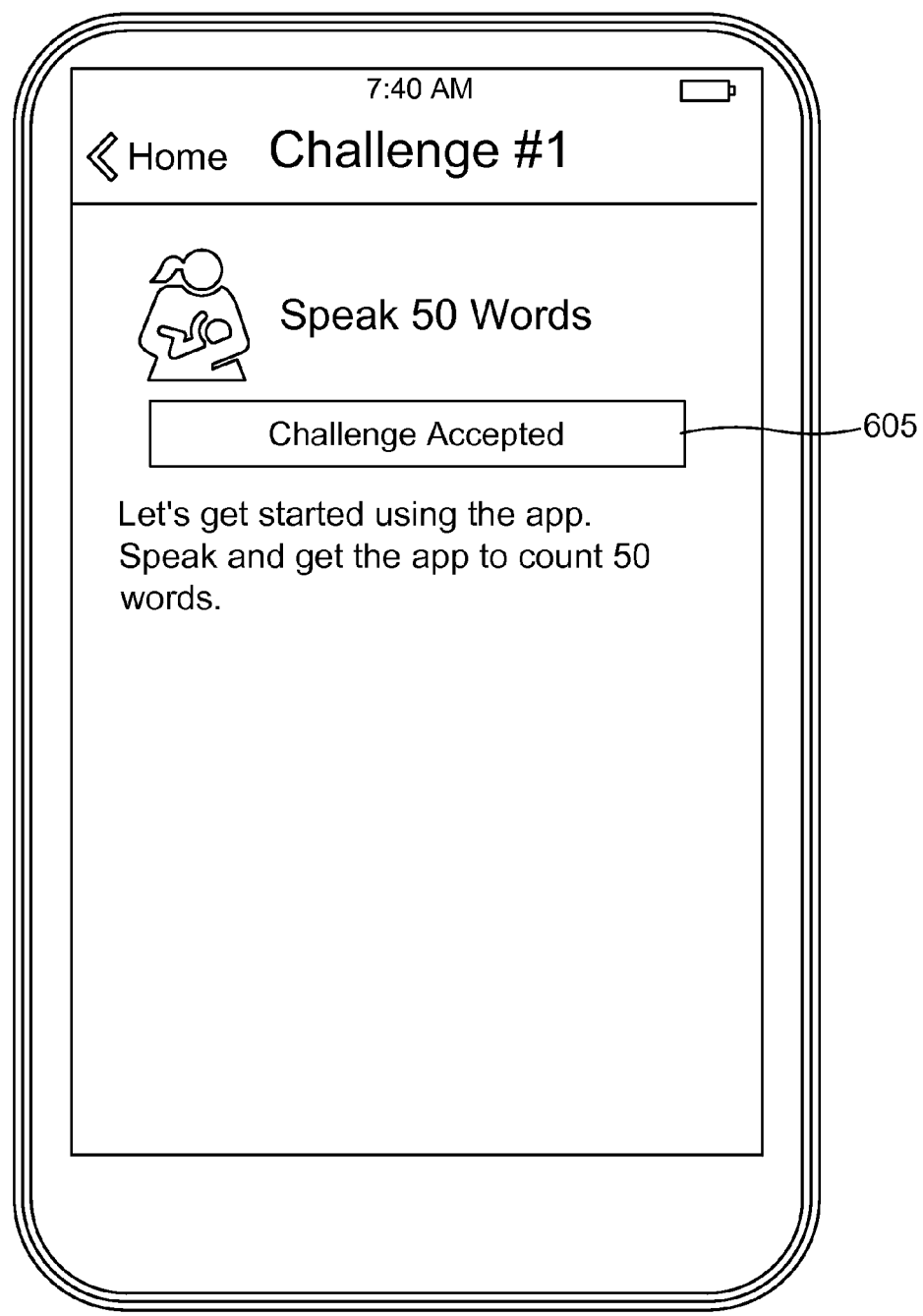
FIG. 6 illustrates an exemplary challenge graphical user interface of a word counting device.

FIG. 6 illustrates an exemplary challenge graphical user interface 600 of the word counting device. As discussed above with respect to graphical user interface 400 shown in FIG. 4, a number of interactive elements may be provided to the user of the word counting device. If the user of the word counting device interacts with challenge user interface element 425, shown in FIG. 4, the word counting device may provide graphical user interface 600 to offer the user one or more solicitations for user interaction. In the case of graphical user interface 600, a solicitation called "challenge #1" is offered to the user to solicit interaction by the user with the word counting device. Graphical user interface 600 further includes an interaction element 605 configured to allow the user to initiate a challenge or other interactive event. When the user selects interaction element 605, the word counting device initiates a challenge and begins monitoring the user's interaction relative to the interactive event. In other words, using the example shown in FIG. 6, when the user selects interaction element 605, the user accepts the challenge to cause the word counting device to count 50 words. The word counting device therefore monitors both the number of words spoken, and the number of words spoken relative to the challenge. Accordingly, when the word counting device registers that 50 words have been spoken, the challenge will cease and another challenge or interactive event may be provided to the user as a solicitation for further interaction by the user with the word counting device.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A method of providing a word count to a user, comprising:
    receiving, by a word counting device, an audio input representative of spoken speech;
    windowing, by the word counting device, the audio input representative of spoken speech;
    determining, by the word counting device, whether or not one or more windows of windowed audio input representative of spoken speech meet one or more speech criteria;
    counting, by the word counting device, a number of instances during which the one or more windows of windowed audio input representative of spoken speech meet one or more speech criteria;
    applying, by the word counting device, a multiplication factor to the number of instances in which the one or more windows of windowed audio input representative of spoken speech meet one or more of the speech criteria;
    determining, by the word counting device and in response to applying the multiplication factor, a word count; and
    outputting, by the word counting device, the word count in a graphical user interface associated with the word counting device.

2. The method of claim 1, wherein windowing the audio input representative of spoken speech further comprises:
    digitally sampling, by the word counting device, the audio input representative of spoken speech;
    dividing, by the word counting device, the digital sampling of the audio input representative of spoken speech into at least a first window of a predetermined duration and a second window of a predetermined duration;
    storing, by the word counting device, the first window in a memory device associated with the word counting device; and
    analyzing, by the word counting device, the digital sampling of the audio input representative of spoken speech in the first window while creating the second window of digital sampling of the audio input of spoken speech.

3. The method of claim 2, wherein the predetermined duration of the first window overlaps with the predetermined duration of the second window.

4. The method of claim 3, further comprising:
    comparing, by the word counting device, at least one sample in the first window with at least one sample within the second window, and
    determining, by the word counting device and based on the comparison, a point within the overlap of the first window with the second window where the first window ends and where the second window begins such that a last sample within the first window and a first sample within the second window are consecutive samples.

5. The method of claim 4, wherein analyzing the first window of digital sampling includes analyzing the first window to the point of the last sample determined to be included within the first window.

6. The method of claim 5, further comprising:
analyzing, by the word counting device, the second window beginning at the point of the first sample determined to be included within the second window.

7. The method of claim 1, wherein determining whether or not one or more windows of windowed audio input representative of spoken speech meet one or more speech criteria includes determining whether or not one or more windows of windowed audio input representative of spoken speech contain a word corresponding to a word within a corpus.

8. The method of claim 7, wherein the corpus contains between 1 and 500 words.

9. The method of claim 1, wherein determining whether or not one or more windows of windowed audio input representative of spoken speech meet one or more speech criteria includes determining whether or not a ratio of a maximum energy envelope in the one or more windows of windowed audio input representative of spoken speech to a minimum energy envelope in the one or more windows of windowed audio input representative of spoken speech exceeds a minimum threshold level.

10. The method of claim 7, wherein counting a number of instances during which the one or more windows of windowed audio input representative of spoken speech meet one or more speech criteria includes counting the number of times a spoken word corresponds to at least one word contained within the corpus.

11. The method of claim 1, wherein applying the multiplication factor to the number of instances during which the one or more windows of windowed audio input representative of spoken speech meet one or more of the speech criteria comprises multiplying the number of instances during which the one or more windows of windowed audio input representative of spoken speech meet one or more of the speech criteria by the multiplication factor.

12. The method of claim 11, wherein the multiplication factor is a number from 0.8 to 2.0.

13. The method of claim 12, wherein the multiplication factor automatically increases as a child ages.

14. A word counting system, comprising:
a microphone configured to receive an audio input representative of spoken speech;
a processor:
windowing the audio input representative of spoken speech,
determining whether or not one or more windows of windowed audio input representative of spoken speech meet one or more speech criteria,
counting a number of instances during which the one or more windows of windowed audio input representative of spoken speech meet one or more speech criteria,
applying a multiplication factor to the number of instances in which the one or more windows of windowed audio input representative of spoken speech meet one or more of the speech criteria,
determining, in response to the applying the multiplication factor, a word count, and
outputting the word count to a graphical user interface associated with the word counting device.

15. The system of claim 14, wherein determining whether or not one or more windows of windowed audio input representative of spoken speech meet one or more speech criteria includes determining whether or not one or more windows of windowed audio input representative of spoken speech contain a word corresponding to a word within a corpus.

16. The system of claim 14, wherein determining whether or not one or more windows of windowed audio input representative of spoken speech meet one or more speech criteria includes determining whether or not a ratio of a maximum energy envelope in the one or more windows of windowed audio input representative of spoken speech to a minimum energy envelope in the one or more windows of windowed audio input representative of spoken speech exceeds a minimum threshold level.

17. The system of claim 14, wherein applying the multiplication factor to the number of instances during which the one or more windows of windowed audio input representative of spoken speech meet one or more of the speech criteria comprises multiplying the number of instances during which the one or more windows of windowed audio input representative of spoken speech meet one or more of the speech criteria by the multiplication factor.

18. The system of claim 17, wherein the multiplication factor is a number from 0.8 to 2.0.

19. The system of claim 14, wherein the graphical user interface includes at least one user interactive element.

20. The system of claim 14, wherein the graphical user interface includes at least one user control element.

* * * * *